Jan. 9, 1968     J. C. BROWN     3,362,450

TIRE CHAIN ASSEMBLY

Filed Aug. 23, 1966

Inventor:
John C. Brown
by Howson & Howson Attys.

United States Patent Office 3,362,450
Patented Jan. 9, 1968

3,362,450
TIRE CHAIN ASSEMBLY
John C. Brown, 304 Maple Ave.,
Delanco, N.J. 08075
Filed Aug. 23, 1966, Ser. No. 574,335
7 Claims. (Cl. 152—233)

ABSTRACT OF THE DISCLOSURE

The present invention relates generally to arrangements for mounting anti-skid tire chains on vehicle wheels and relates more particularly to a novel assembly which permits the rapid mounting and removal of a seleceted number of individual cross chains to a wheel without jacking the wheel off the ground. An anti-skid device characterized by cross chains attached at their opposite ends to a support ring and an adapter ring on the axially inner and outer sides respectively of the wheel.

---

A number of arrangements have heretofore been advanced for securing individual anti-skid cross chains to a vehicle wheel. A relatively recent arrangement for this purpose is the subject of my U.S. Patent 3,151,655, issued Oct. 6, 1964. A common shortcoming of the majority of these devices, however, is the limited number of cross chains which the device is able to accommodate, the number generally being substantially less than that found on the conventional tire chain. For example, in the arrangement disclosed in my above-cited patent, the number of cross chains is limited to the number of studs securing the wheel to the brake drum, this number being five for the typical automobile wheel. An additional problem with many of the previously proposed arrangements is the difficulty of attaching the innermost end of the cross chains, it generally being necessary to grope behind the wheel for a specific point of attachment of the chain end which often cannot be readily located.

In the present arrangement, the number of cross chains is not limited by the number of wheel-securing studs and it is possible to employ 12 or more cross chains if required by driving conditions. The present arrangement furthermore permits attachment of the inner chain ends at any one of a large number of closely spaced positions.

In view of the above, it can be understood to be a first object of the present invention to provide an improved tire chain assembly for the mounting of a selected number of cross chains to a vehicle wheel.

A further object of the invention is to provide a tire chain assembly as described wherein the number of cross chains which may be applied to the wheel is not limited by the number of wheel-securing studs.

Another object of the invention is to provide a tire chain assembly as described wherein the inner ends of the chains may be quickly and easily attached at a large number of positions behind the wheel.

Still another object of the invention is to provide a tire chain assembly as described which permits a rapid mounting and removal of the chains and an easily adjustable positive tensioning of each chain.

A still further object of the invention is to provide a tire chain assembly as described of a simplified construction which can be economically manufactured and easily installed on a vehicle wheel.

Additional objects and advantages of the invention will be more readily apparent from the following detailed description of embodiments thereof when taken together with the accompanying drawings in which.

Figure 1:
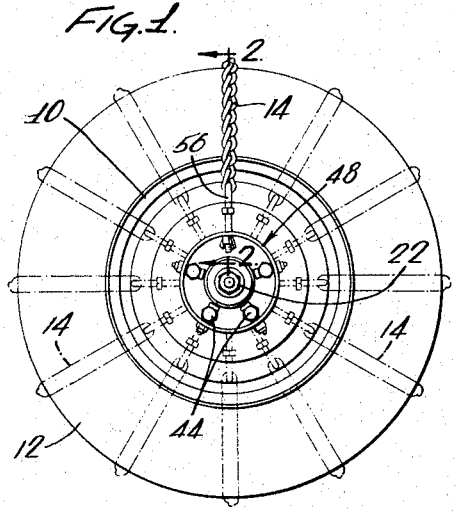
FIG. 1 is a side elevational view showing a vehicle wheel and tire on which is mounted a tire chain assembly in accordance with the present invention.
Figure 2:
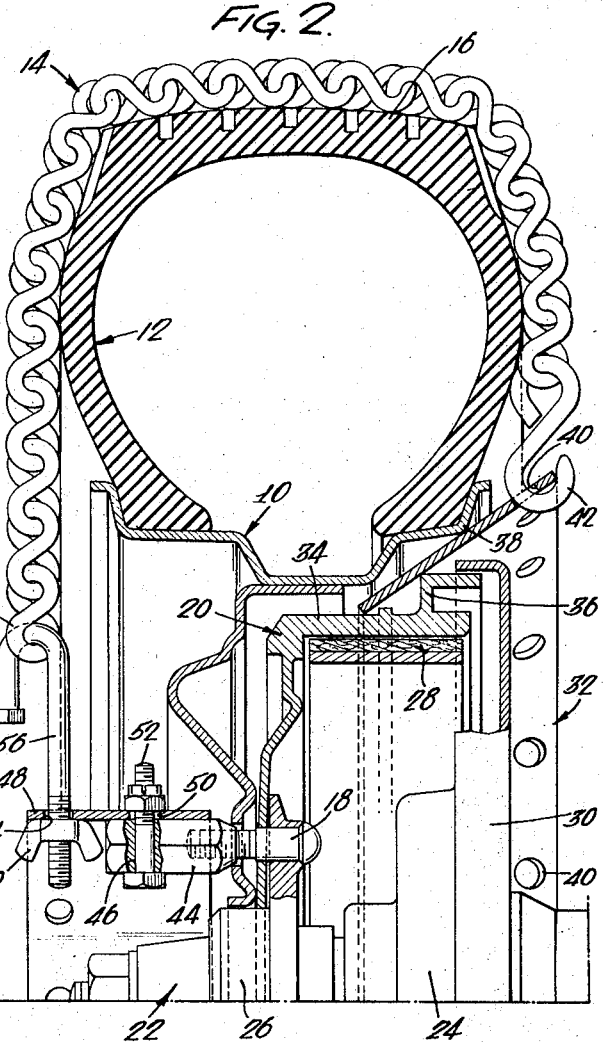
FIG. 2 is an enlarged sectional view taken along line 2—2 of FIG. 1 showing details of the tire chain assembly.
Figure 4:
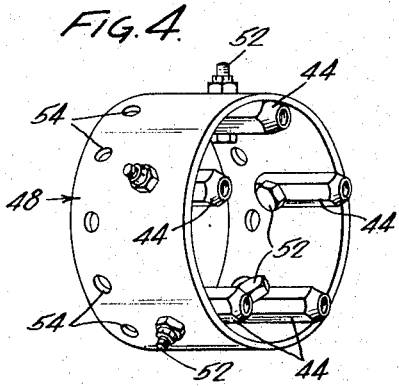
FIG. 4 is a perspective view showing the cylindrical chain adapter attached to the wheel-securing lug nuts.
Figure 5:
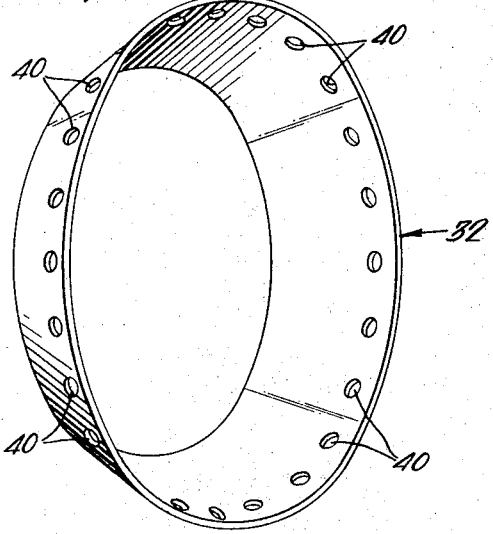
FIG. 5 is a perspective view showing the chain support ring.

Referring to the drawings, and particularly FIGS. 1 and 2 thereof, a vehicle wheel 10 having a tire 12 mounted thereon is shown equipped with a plurality of cross chains 14 which are held tightly against the tire tread 16 by the novel assembly of the present invention. The cross chains 14 serve in a well known manner to prevent skidding and to provide added traction on surfaces covered with snow, ice or mud, as well as loose surfaces such as sand or gravel. Each of the cross chains 14 is individually mounted and tensioned, and as many chains may be mounted as are required by conditions, the number of chains not being limited by the number of wheel-securing studs as will presently be apparent.

As shown in FIG. 2, the wheel 10 is mounted on studs 18 extending outwardly from the brake drum 20 which is shown mounted on a rear axle assembly 22 in a conventional manner. The rear axle assembly includes inner bearing and seal 24, and outer bearing and seal 26. Mounted within the brake drum 20 is the brake shoe 28, and a brake cover 30 is provided to protect the brake surfaces.

The cross chains 14 are secured adjacent the inner side of the wheel by connection to the frusto-conical shaped chain support ring 32 which, as shown in FIG. 1, is dimensioned to fit over the outer cylindrical surface 34 of the brake drum 20. The ring 32 is clamped in the illustrated position by the flange 36 of the brake drum contacting the radially inner face of the ring, and the shoulder 38 of the wheel contacting the radially outer face of the ring. The ring is thus secured in place solely by the conventional brake drum and wheel structure, the conical angle of the ring being appropriately chosen to cooperate with the wheel and brake drum configurations. The radially outer edge of the ring 32, which extends axially inwardly of the wheel 10, is provided with a plurality of closely spaced holes 40 through which hooks 42 attached to the inner ends of the cross chains 14 are adapted to pass. By providing a large number of holes 40, for example 24 as shown in the preferred embodiment of the invention, it is a relatively easy step to locate one of the holes from outside of the tire and attach a hook 42 therethrough.

The outer ends of the cross chains 14 are adjustably secured in the following manner. Elongated nuts 44 are substituted for the usual wheel-securing lugs, each elongated nut having a hole 46 in the outer end thereof perpendicular to the nut axis. Overlying the several elongated nuts 46 coaxial with the axle assembly 22 is the hollow cylindrical adapter 48 which is provided with appropriately spaced holes 50 through which bolts 52 may be passed to secure the adapter to each of the stud nuts 44, the bolts passing through the holes 46 in the outer ends of the nuts. The holes 50 should be somewhat larger than the bolts 52 to allow for slight variations in the axial position of the several nuts on their respective studs.

The adapter 48 extends axially outwardly well beyond the elongated nuts 44 and includes around the outer edge thereof a plurality of spaced holes 54. Chain-securing bolts 56 which pass through the outer links 58 of the cross chains 14 are inserted in the holes 54 and are provided with wing nuts 60 to permit the desired tensioning of the chains. In the illustrated embodiment, the bolts 56 comprise conventional hexhead bolts having the shank portion thereof bent into a hook shape although it is obvious that eye-bolts or other suitable fastenings could be used. The wing nuts 60 are preferably of the self-locking type to prevent loosening thereof during service.

In the illustrated embodiment, the adaptor 48 is provided with 12 holes 54 so that a total of 12 cross chains can be applied at one time to a tire as is shown in FIG. 1. Any number of cross chains from 1 to 12 can, of course, be employed as required by driving conditions. If desired, the number of holes in the adapter can exceed 12 although this is normally sufficient for even the most extreme conditions.

For installation of the assembly, the wheel on which the device is to be applied is removed from the brake drum and the ring 32 is slid over the drum into the position shown in FIG. 2. The wheel is then replaced on the studs, and the elongated nuts 44 are screwed onto the studs to fasten the wheel securely in place, which also serves to secure the ring 32 in the proper position. The nuts 44 are adjusted if necessary to bring the holes 46 into a radial alignment and the adapter 48 is then slid over the nuts to permit insertion and tightening of the bolts 52. The wheel is now ready to receive the cross chains and can be left in this condition, with the ring 32 and adapter 48 in place, during the entire winter season.

When conditions require the attachment of one or more cross chains, each chain is attached by reaching behind the wheel with the hook 42 and inserting the hook in any one of the holes 40 in the ring 32. The bolts 56 on the outer end of the chain is then inserted through one of the holes 54 in the adapter 48 and the wing nut 60 is tightened to provide the desired tension of the chain against the tire tread 16. Each chain may thus be mounted in a matter of seconds and may be removed with equal ease simply by removing the wing nut 60 and unhooking the hook 42 from the ring 32.

Since there are no resilient elements involved in the present assembly, the chains are held securely against the tire tread and the familiar whipping of the chains against the road surface with its undesirable noise and destructive effect are eliminated. Chain and tire life are thus greatly lengthened in contrast with conventional tire chains, particularly since only as many cross chains as are needed need be mounted at any given time. With conventional chains, it is of course necessary to apply either all of the cross chains or none while in the present instance a single cross chain may be mounted alone if that is all that is required to maintain traction in a particular situation.

An attractive feature of the present tire chain assembly is the economy with which the assembly may be produced. The ring 32 may be formed from a pre-drilled sheet metal blank which is stamped into the appropriate frusto-conical configuration. The adapter 48 may simply be cut from steel tubing and drilled to provide the necessary holes. The nuts, bolts and chain are, of course, commercially available items which may be inexpensively obtained. All of the elements should be plated to prevent corrosion, and the adapter 48 and nuts 44 are desirably chrome plated to provide an attractive appearance of the assembly.

Figure 3:
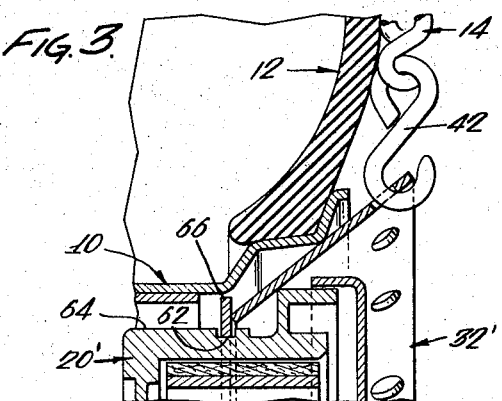
FIG. 3 is a partial sectional view similar to that of FIG. 2 showing a modified arrangement for mounting the chain support ring.

An alternate manner of securing the chain supporting ring is illustrated in FIG. 3 which may be better suited for certain types of brake drum and wheel configurations. In this arrangement the chain support ring 32' is inclined at a somewhat steeper conical angle than that of the previously described embodiment to adapt to the brake drum 20' which is of a type having a groove 62 in the outer cylindrical surface 64 thereof. In this embodiment a split ring 66 is inserted in the groove 62 of the brake drum after positioning of the ring 32' thereon to serve as a support for the ring. The ring 66 further serves to prevent the ring 32' from dropping off the brake drum should the wheel be removed for any reason. The ring 32' functions in exactly the same manner as the ring 32 of the above described embodiment and differs only in its means of attachment to the brake drum.

From the above description it can be understood that the present invention provides an improved, inexpensive arrangement for attaching cross chains to a vehicle tire. Any number of cross chains can be attached, the number not being limited by the number of wheel-securing studs. By means of the plurality of holes in the inner adapter element, the attachment of the inner cross chain ends may be quickly and easily accomplished and the installation of a number of cross chains to the rear wheels of a vehicle should take only a fraction of the time presently required to install conventional tire chains.

Manifestly, changes in details of construction can be effected by those skilled in the art without departing from the spirit and the scope of the invention as defined in and limited solely by the appended claims.

I claim:

1. An anti-skid tire chain assembly for a vehicle having a brake drum and a wheel adapted to be secured thereto by nuts threaded on studs carried by the brake drum and projecting axially outwardly through openings in the wheel, said assembly comprising a frusto-conical shaped chain support ring secured between the brake drum and the wheel, the radially outer edge of said support ring extending axially inwardly beyond the axially inner edge of said wheel, a plurality of spaced holes along the radially outer edge of said support ring, at least one cross chain adapted to extend transversely about a tire mounted on the wheel, a hook on the inner end of said cross chain adapted for detachable engagement with said support ring through one of the holes in said ring, elongated nuts on the brake drum studs securing the wheel to the brake drum, each said nut having a transverse hole in the outer end thereof, a hollow cylindrical adapter coaxial with said wheel passing around said elongated nuts, a plurality of bolts extending through the holes in said nuts and through said cylindrical adapter to secure said adapter to said nuts, the outer edge of said adapter extending outwardly of said nuts and having a plurality of spaced holes therein, a bolt connected to the outer end of said cross chain and adapted to pass through one of the holes in the outer edge of said adapter, and a nut on said latter bolt for tensioning the cross chain about the vehicle tire.

2. An anti-skid tire chain assembly as claimed in claim 1, wherein the wheel in the normal mounted position engages and clamps said ring against a flange on the brake drum.

3. An anti-skid tire chain assembly as claimed in claim 1, wherein the bolt connected to the outer end of said cross chain is adapted to pass through a link of said cross chain.

4. An anti-skid tire chain assembly for a vehicle having a brake drum and a wheel adapted to be secured thereto by nuts threaded on studs carried by the brake drum and projecting outwardly through openings in the wheel, said assembly comprising means for releasably securing and tensioning the outer end of at least one cross chain, said means comprising elongated nuts on each of the brake drum studs securing the wheel to the brake drum, each of said elongated nuts having a transverse hole in the outer end thereof, a hollow cylindrical adapter coaxial with said wheel passing around said elongated nuts, a plurality of bolts extending through the holes in said nuts and through said cylindrical adapter to secure said adapter to said nuts, the outer edge of said adapter extending outwardly of said nuts and having a plurality of spaced holes therein, a bolt connected to the outer end of said cross chain and adapted to pass through one of the holes in the outer edge of said adapter, and a nut on said latter bolt for tensioning the cross chain about the vehicle tire.

5. An anti-skid tire chain assembly as claimed in claim 4, wherein said bolt connected to the outer end of said cross chain is adapted to pass through a link of the cross chain.

6. An anti-skid tire chain assembly for a vehicle including a brake drum having an annular flange extending radially outwardly from the axially inner edge thereof with a wheel mounted on the brake drum and a tire mounted on the wheel, the assembly comprising means for releasably securing the inner end of a cross chain, said means including a frusto-conical shaped chain support ring adapted for positioning over said brake drum with the radially inner surface thereof in engagement with said flange and the radially outer surface thereof in engagement with a shoulder of said wheel, the radially outer edge of said chain support ring extending axially inwardly beyond the axially inner edge of said wheel, a plurality of spaced holes along the radially outer edge of said support ring, and a hook on the inner end of said cross chain adapted for detachable engagement through one of the holes of said support ring.

7. An anti-skid tire chain assembly as claimed in claim 6 wherein said brake drum includes a groove in the outer surface thereof spaced from said flange, and a ring positioned in said groove for supporting said chain support ring and preventing axial movement thereof when said wheel is removed from the brake drum.

References Cited

UNITED STATES PATENTS

| 2,751,958 | 6/1956 | Weddington | 152—233 |
| 3,037,543 | 6/1962 | Moore | 152—233 |
| 3,151,655 | 10/1964 | Brown | 152—233 |

ARTHUR L. LA POINT, *Primary Examiner.*